United States Patent [19]

Smith et al.

[11] Patent Number: 5,470,102
[45] Date of Patent: Nov. 28, 1995

[54] AIR BAG MODULE WITH AN OFF-CENTER MOUNTED TUBULAR INFLATOR

[75] Inventors: Bradley W. Smith, South Ogden; Kirk Rasmussen, West Point; John E. Allard, North Ogden, all of Utah

[73] Assignee: Morton International, Inc., Chicago, Ill.

[21] Appl. No.: 322,818

[22] Filed: Oct. 13, 1994

[51] Int. Cl.⁶ .................................................. B60R 21/16
[52] U.S. Cl. ........................................ 280/728.2; 280/732
[58] Field of Search ............................. 280/728.2, 732, 280/741

[56] References Cited

U.S. PATENT DOCUMENTS

| | | | |
|---|---|---|---|
| 3,778,084 | 12/1973 | Sutherland et al. | 280/741 |
| 4,915,410 | 4/1990 | Bachelder | 280/732 |
| 5,121,941 | 6/1992 | Mihm et al. | 280/732 |
| 5,186,492 | 2/1993 | Wright et al. | 280/728.2 |
| 5,211,421 | 5/1993 | Catron et al. | 280/728.2 |
| 5,290,059 | 3/1994 | Smith et al. | 280/728 |
| 5,382,046 | 1/1995 | Cuevas | 280/728.2 |

FOREIGN PATENT DOCUMENTS

| | | | |
|---|---|---|---|
| 492735 | 3/1990 | Japan . | |
| 2247214 | 2/1992 | United Kingdom | B60R 21/16 |
| 2257400 | 1/1993 | United Kingdom | B60R 21/16 |

*Primary Examiner*—Kenneth R. Rice
*Attorney, Agent, or Firm*—Gerald K. White

[57] ABSTRACT

An air bag module uses a tubular inflator that is mounted off center in the module with the diffuser lying in the plane of the bottom of the module housing. The housing and inflator retaining bracket combine to make a pocket which changes the direction of some of the gas produced by the inflator and allows all of the gas to flow up into the inflatable cushion. A different housing, retaining ring, cushion and inflator retaining bracket are used in the assemblage of the module than are employed in air bag modules of current production. The appearance and function of the module, however, is not changed to a purchaser of the automotive vehicle in which the module is installed, only the internal components of the module are changed.

11 Claims, 5 Drawing Sheets

FIG. 1
FIG. 3
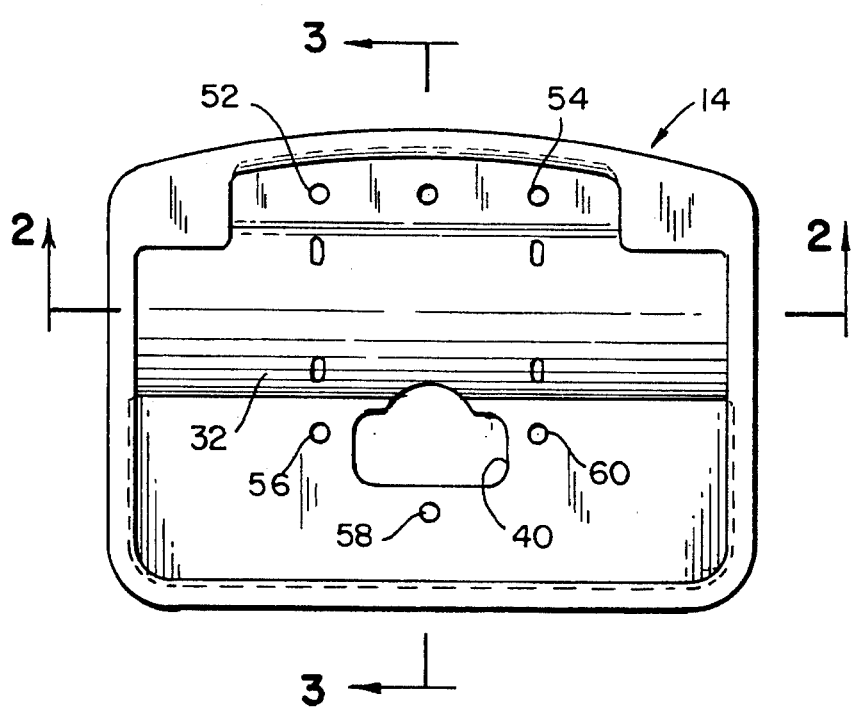
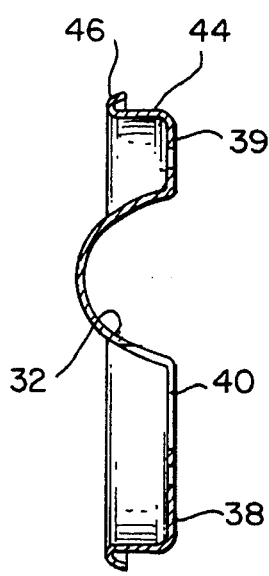
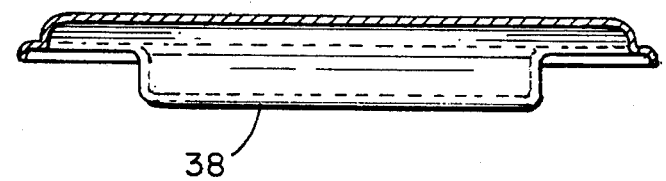
FIG. 2

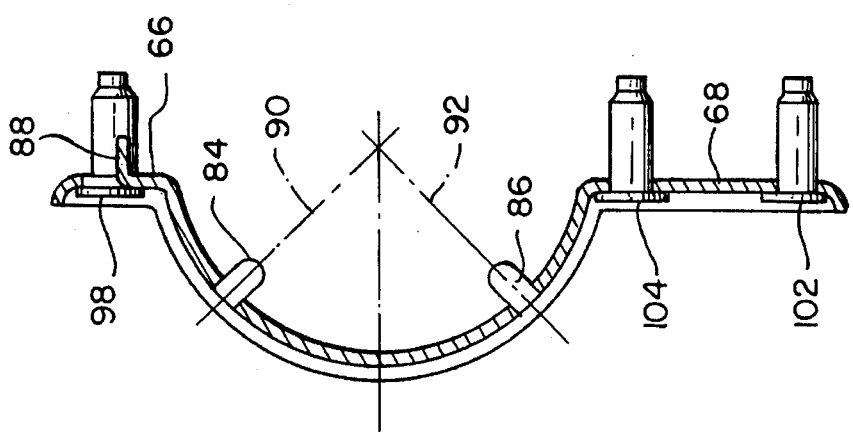
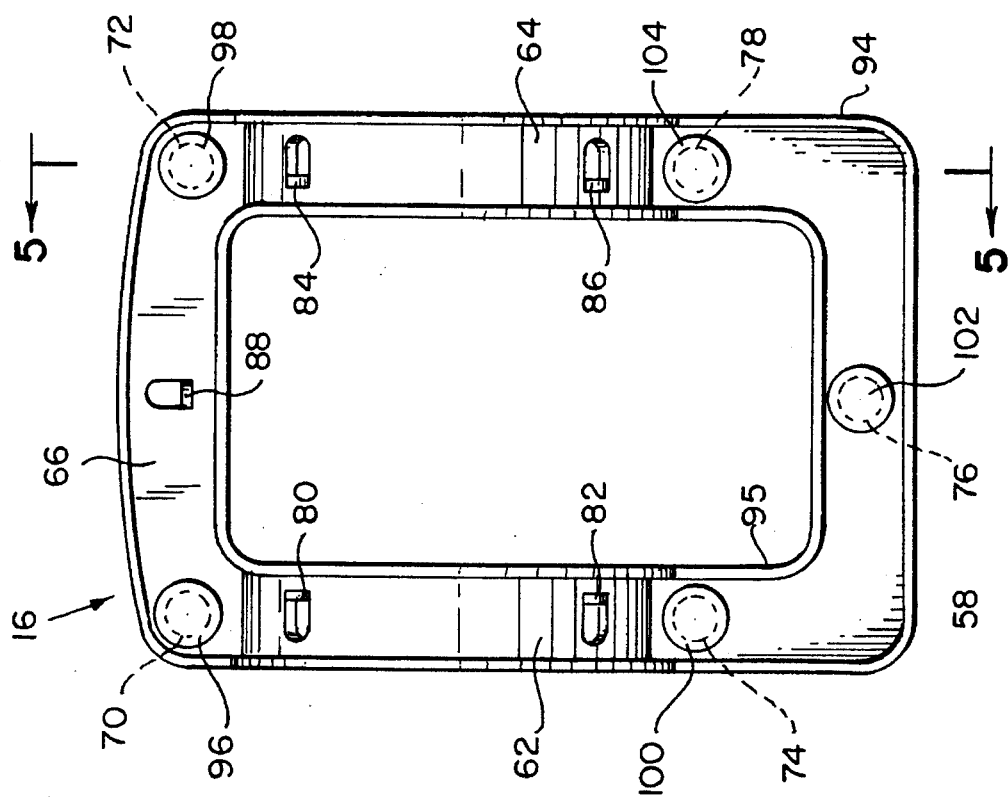
FIG. 5
FIG. 4

AIR BAG MODULE WITH AN OFF-CENTER MOUNTED TUBULAR INFLATOR

BACKGROUND OF THE INVENTION

1. Field of the Invention

This invention relates to an air bag module for use on the driver side of automotive and other vehicles wherein an inflatable air bag or cushion is inflated in the event of a collision to protect the driver from injury that could result from being forcibly thrown against the steering wheel, dashboard, etc. The air bag module uses an off-center positioned tubular inflator.

2. Description of the Related Art

Inflator assemblies that currently are in use in driver side air bag modules typically are toroidal types having flat, disk-like shapes. With the dimensions of the inflator assembly characteristically being about two inches (2") thick and four inches (4") in diameter, much of the inflatable cushion stored in the air bag module is folded in front of the inflator assembly as opposed to the sides thereof. While an inflator assembly having a tubular shape would allow much of the cushion to be folded on the sides thereof in an air bag module, a tubular inflator assembly will not fit in driver side air bag modules as they are currently designed.

Inflator assemblies of the toroidal type produce a cushion inflating gas source from a combustible gas generating material which, upon ignition, generates a quantity of gas sufficient to inflate the cushion. One form of tubular inflator assembly similarly is operative to generate gas for inflating cushions from a combustible gas generating material. In another form of tubular inflator assembly, however, the cushion inflating gas results from a combination of stored compressed gas and a gas generating material. The latter form of tubular inflator assembly is commonly referred to as an augmented gas or hybrid inflator. Hybrid inflators affect the performance of air bag modules in several ways including variation in the amount of stored gas, the transmission of heat to the stored gas, and the rate at which the inflating gas is dispensed into the inflatable cushion.

In U.S. Pat. No. 5,290,059 that was issued on Mar. 1, 1994 to Bradley W. Smith, Gary V. Adams and Kirk Rasmussen and assigned to the assignee of the present invention, there is disclosed an air bag module for use on the driver side of automotive and other vehicles which utilizes a center mounted tubular inflator. A different housing, retaining ring, cushion and inflator bracket are used than are employed in air bag modules of current production. The appearance and function of the module are not changed but only the internal components. The center mounted tubular inflator of the Smith et al. patent is located in a slotted section of the module housing with the diffuser thereof protruding upwardly from the center through a hole in a raised portion of the module housing slotted section, which hole is sized closely to the size of the diffuser. The diffuser extends directly into the module at a 90° angle to the plane surface of the housing. The retaining ring has raised portions in the center thereof to match the raised portion of the module housing, has holes in the raised portions, and has tabs which extend through holes in the cushion and the module housing. The module housing has tabs on the raised portion thereof which extend through holes in the cushion and retaining ring. The cushion uses a rectangular mounting so that the cushion matches the radius of the module housing in the raised portion which goes over the tubular inflator. The retaining bracket extends around the back side of the inflator to hold it in place and includes cover retaining brackets. Studs which hold the module together extend from the retaining ring through holes in the cushion, module housing and retaining bracket.

Driver side air bag modules, which are currently produced, use a toroidal inflator in them. There is a need and a demand to provide a driver side air bag module in which a tubular inflator assembly may be used to facilitate folding of much of the cushion on the sides of the inflator and to affect the performance of the air bag module, and, additionally, which allows the envelope of the module to be smaller than that obtained using the center mounted tubular inflator arrangement of the aforementioned Smith et al. patent. The present invention was devised to fill the technological gap that has existed in the art in this respect.

SUMMARY OF THE INVENTION

An object of the invention is to provide an improvement to air bag modules for the driver side of automotive and other vehicles which allows the envelope of the module to be smaller.

Another object of the invention is to provide such an improvement wherein the inflator employed is of the tubular type and the envelope of the module is smaller due to a decrease in the distance from the front of the cover to the back of the module.

Still another object of the invention is to provide for the driver side of an automotive or other vehicle an air bag module which uses an off-center mounted tubular inflator assembly.

A further object of the invention is to provide such an air bag module in which the tubular inflator assembly is of the augmented gas or hybrid type.

Another object of the invention is to provide such an air bag module in which the tubular inflator assembly is held very firmly in position within the air bag module during the life of the module.

In accomplishing these and other objectives of the invention, there is provided an air bag module using a tubular inflator which is mounted off center in the module with the diffuser located in the plane of the bottom of the module housing. The module housing and an inflator retaining bracket combine to make a pocket. The pocket changes the direction of some of the gas and allows all of the gas to flow up into the cushion. The invention is characterized in its use of a different housing, retaining ring, cushion and inflator bracket than employed in air bag modules of current production and in the aforementioned Smith et al. application for U.S. patent. There is no change in the appearance and function of the car, however, insofar as the purchaser of the vehicle is concerned. Only the internal components of the module are changed.

In a preferred embodiment of the invention, the tubular inflator assembly is a hybrid type such as that disclosed in the aforementioned U.S. Pat. No. 5,290,059. The tubular inflator assembly comprises a pressure vessel including a storage chamber that is filled and pressurized with an inert gas such as Argon or Nitrogen to a pressure typically in the range of 2000–4000 psi. The storage chamber is defined by an elongated tube or sleeve. A first end of the sleeve is closed by a fill plug. A pyrotechnic heater is recessed in sealing relation into the storage chamber from a second end of the sleeve. A diffuser protrudes, that is, projects outwardly in sealing relation at substantially a 90° angle from the exterior surface of the sleeve at a location intermediate the first and second ends thereof. Provided in the diffuser are a plurality of gas exit ports or orifices for dispensing inflating gas uniformly in opposing directions in a thrust neutral manner from the pressurized chamber.

The tubular inflator is placed within an upwardly extending concave or slotted section of the module housing, which section is set off center toward the top of the module. The diffuser of the inflator is placed in the plane of the bottom of the housing. The diffuser extends into a hole in the housing, which permits the gas to go into the cushion. This hole in the housing is sized so that the diffuser fits tightly in the hole with the hole wrapped around the neck of the diffuser. The hole increases in size in the area where the gas exit ports or holes are in the diffuser and provides, that is, makes available, space for the gas to come out of ports in the diffuser, flow around the diffuser and fill the cushion. The tight fit of the housing and inflator retaining bracket around the diffuser neck provide a seal to force the gas into the cushion and retain the inflator from moving in the module in two of the three directions. Movement in the third direction is prevented by the inflator retaining bracket which goes around the back side of the inflator. The housing uses a snap in groove concept used in air bag modules of current production to attach a cover to the module assembly.

The cushion retaining ring in the module is not flat, but has an upwardly extending concave portion in the center of the ring to match the upwardly extending slotted portion of the module housing. The retaining ring is positioned within an inflating gas inlet opening in the cushion, adjacent the edge of the opening, and holds the cushion as the cushion is spread over the upwardly extending portion of the inflator and housing. The retaining ring is used without rivets. In a preferred embodiment of the invention, tabs are used in the retaining ring and extend into holes in the cushion. Contacting the adjacent surface of the upwardly extending slotted portion of the module housing, these tabs act as stops. Studs, which have been pressed into the retaining ring, extend through cushion attach points, the module housing, and the inflator retaining bracket. When the nuts on the studs are torqued down, the studs attach the module components together. While the use of a retaining ring having tabs is preferred, the use of a retaining ring having no tabs is an option.

The cushion used in the module has a different mounting arrangement than the cushions that are used in air bag modules of current production. Instead of a round mounting pattern in the cushion, a rectangular mounting is used. This allows the cushion to match the radius of the module housing in the raised portion that goes over the inflator.

The inflator retaining bracket of the module extends around the back side of the inflator to hold it in place. A pocket is made in the inflator retaining bracket to support the diffuser of the inflator and to allow the gas coming out of the bottom diffuser holes to change direction and go up into the cushion. The pocket seals against the housing to make sure that the gas goes into the cushion. Cover retaining brackets are incorporated in the inflator retaining bracket so that it is a one piece system, instead of three pieces as in many currently produced driver side air bag modules. The radius of the retaining bracket is made such that when the nuts on the studs which hold the module together are torqued down, the inflator is held very firmly in position during the life of the module.

Steering wheel mounting points as shown on the inflator retaining bracket in the illustrated embodiment of the invention comprise a three point mounting system. As those skilled in the art understand, other arrangements are possible with a four point mounting system or a two point mounting system.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which:

FIG. 1 is a top view of the air bag module housing according to the invention;

FIG. 2 is a sectional view of the air bag module housing taken along the lines 2—2 of FIG. 1;

FIG. 3 is a sectional view of the air bag module housing taken along the lines 3—3 of FIG. 1;

FIG. 4 is a top view of the cushion retaining ring;

FIG. 5 is a sectional view of the cushion retaining ring taken along the lines 5—5 of FIG. 4;

DESCRIPTION OF THE PREFERRED EMBODIMENT

Figure 10:
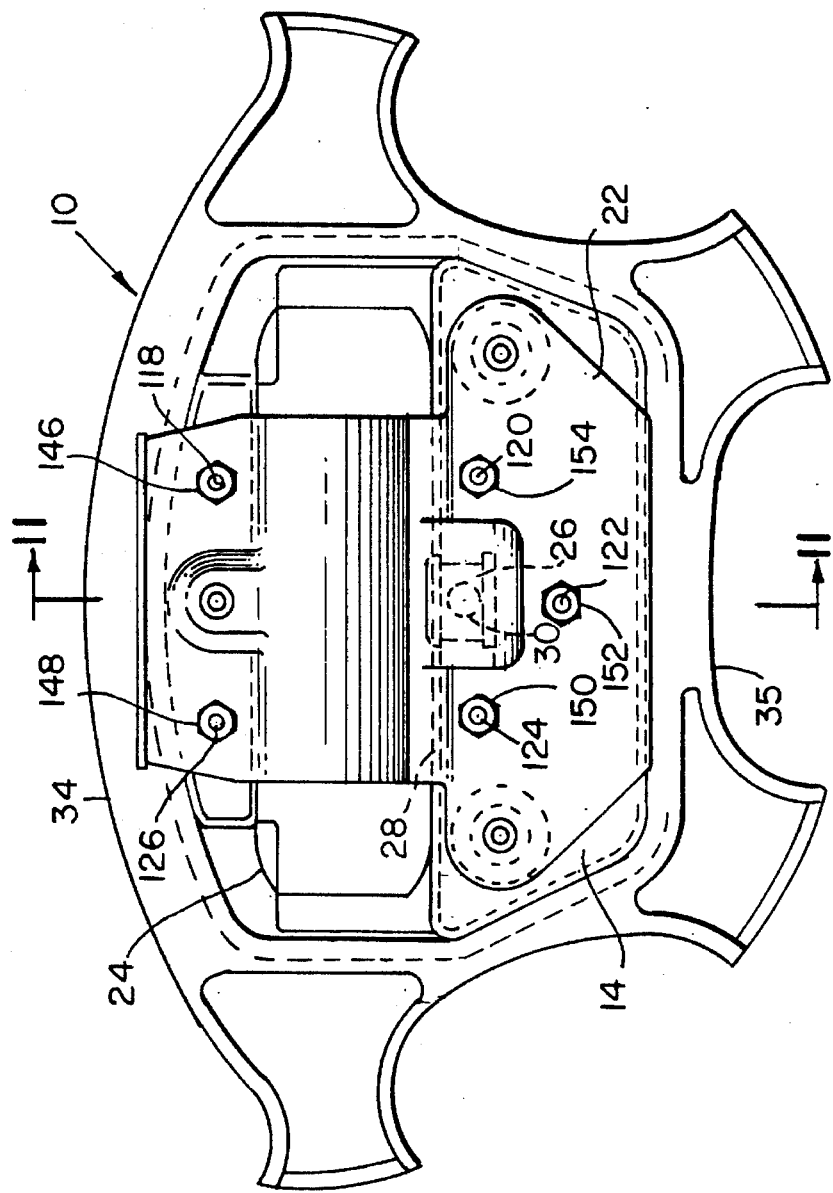
FIG. 10 is a bottom view of the assembled air bag module assembly.
Figure 11:
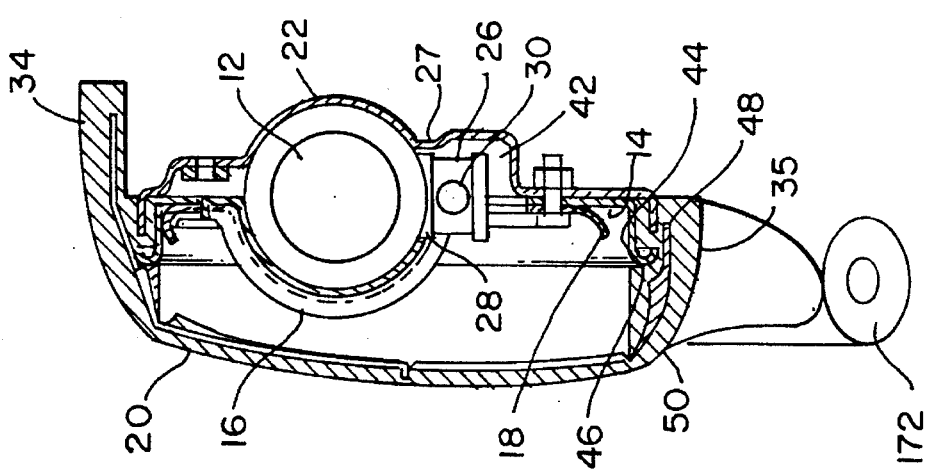
FIG. 11 is a sectional view of the air bag module assembly taken along lines 11—11 of FIG. 10.

Referring to FIGS. 10 and 11 of the drawing, an air bag module 10 according to the invention comprises a tubular inflator assembly 12, a module housing 14, a cushion retaining ring 16, a folded inflatable cushion 18, a module cover 20, and a tubular inflator retaining bracket 22.

The tubular inflator assembly 12 includes an elongated sleeve or tube 24 and a diffuser 26. The diffuser 26, as best seen in FIGS. 10 and 11, projects laterally outwardly from a generally central position on the exterior tubular surface 28 of the sleeve 24 at substantially a 90° angle. A plurality of gas exit ports or orifices 30 facing in different directions in the diffuser 26 dispense inflating gas in a thrust neutral manner so that upon initiation of the tubular inflator assembly 12 and flow of gas through ports 30 there are no forces that tend to cause disruptive movement of the inflator assembly 12 in the air bag module 10.

The tubular inflator 12 is placed in a slotted section 32 having a concave wall that extends upwardly from flat base member 38 and 39 that comprise spaced portions of a bottom wall of the module housing 14. Slotted section 32, as illustrated in FIGS. 1–3, runs the width of the module housing 14 and is set off center of the module 10 closer to the top 34 of the module 10 than to the bottom 35 thereof, as illustrated in FIGS. 10 and 11.

The diffuser 26 of the tubular inflator 12 is cylindrically shaped and protrudes from a position intermediate the ends of the inflator assembly 12 in the plane of the bottom 38 of the module housing 14 through a hole or opening 40 that is formed in the bottom 38 and in an adjacent portion of the slotted section 32. The portion of the opening 40 in the slotted section 32 is shaped closely to the shape of the cylindrically shaped diffuser 26 and the diffuser 26 fits snugly therein. Thus, the tubular inflator assembly 12 is fixedly attached to and made firm in position with respect to the module housing 14.

A cavity 42 into which diffuser 26 extends, as shown in FIG. 11, increases in size in the region where the gas exit ports 30 are located in the diffuser 26. This provides space for the gas to flow out of the ports 30, to flow around the diffuser 26, and to flow into and fill the cushion 18.

A tight fit of the housing 14 and the inflator retaining bracket 22 around the neck 27 of the diffuser 26 provides a seal to force the gas into the cushion 18 and retains the inflator 12 from moving in the module 10 in two of the three directions. Movement in the third direction, as shown in FIGS. 10 and 11, is prevented by the inflator retaining bracket 22 which is positioned around the outside, that is, the back side of the inflator 12.

The module housing 14 further includes a completely surrounding upwardly extending wall 44. The upper edge of the wall 44, as shown in FIG. 3 is curled outwardly forming a rolled over lip 46. Lip 46 engages and is locked in mating relation in a groove 48 in the wall of an inner portion 50 of cover 20, as best seen in FIG. 11, when the module housing 14 and the folded inflatable cushion 18 are pressed in place within the cover 20.

Two spaced holes 52 and 54 are provided in the flat bottom 39 of the module housing 14 on one side of the slotted section 32, specifically that nearest the top 34 of the module, and three spaced holes 56, 58 and 60 are provided in the flat bottom 38 on the other side of the slotted section 32. The five holes 52, 54, 56, 58 and 60 provide a means for the attachment to the module housing 14 of the cushion retaining ring 16, the folded inflatable cushion 18, the tubular inflator 12, and of the tubular inflator retaining bracket 22.

The cushion retaining ring 16, as shown in FIGS. 4 and 5, includes two slotted sections 62 and 64 each of which matches the contour of the slotted section 32 of the module housing 14. The slotted section 62 is positioned between retaining ring base members 66 and 68 at one end of each of the latter and the slotted section 64 is positioned between the base members 66 and 68 at the other ends thereof. The base members 66 and 68 are positioned in the same plane.

As shown in FIG. 4, the base members 66 and 68 are both U-shaped, with the legs of the base member 68 being substantially longer than the legs of the base member 66. Spaced holes 70 and 72 are provided in base member 66 and spaced holes 74, 76 and 78 are provided in base member 68.

Spaced tabs 80, 82 and 84, 86 are provided in the slotted sections 62 and 64, respectively, of the retaining ring 16. Tabs 80 and 84 are positioned adjacent base member 66 and tabs 82 and 86 are positioned adjacent base member 68. Additionally, a tab 88 is located generally centrally in member 66. Tabs 80, 82, 84, 86 and 88 extend through slots in the cushion 18 and module housing 14 adjacent the edge of the inflating gas inlet opening into contact with the adjacent upper surface of the module housing slotted section 32 and keep the cushion 18 from moving during deployment.

As shown in FIG. 5, the positioning of the pairs of tabs 80, 82 and 84, 86 is such that the angle formed between dotted straight lines 90 and 92 drawn from the centers of tabs 84, 86 and 80, 82 through the center of the curves of the slotted sections 62 and 64 is substantially 90°.

The retaining ring 16 includes at the periphery, or more specifically the perimeter, thereof, an upwardly curled edge 94. At the inner boundary thereof, the retaining ring 16 includes an upwardly curled edge 95 that is similar to the curled edge 94.

The retaining ring 16 also includes five studs 96, 98, 100, 102 and 104 which are pressed into a respectively associated hole 70, 72, 74, 76 and 78.

Figure 6:
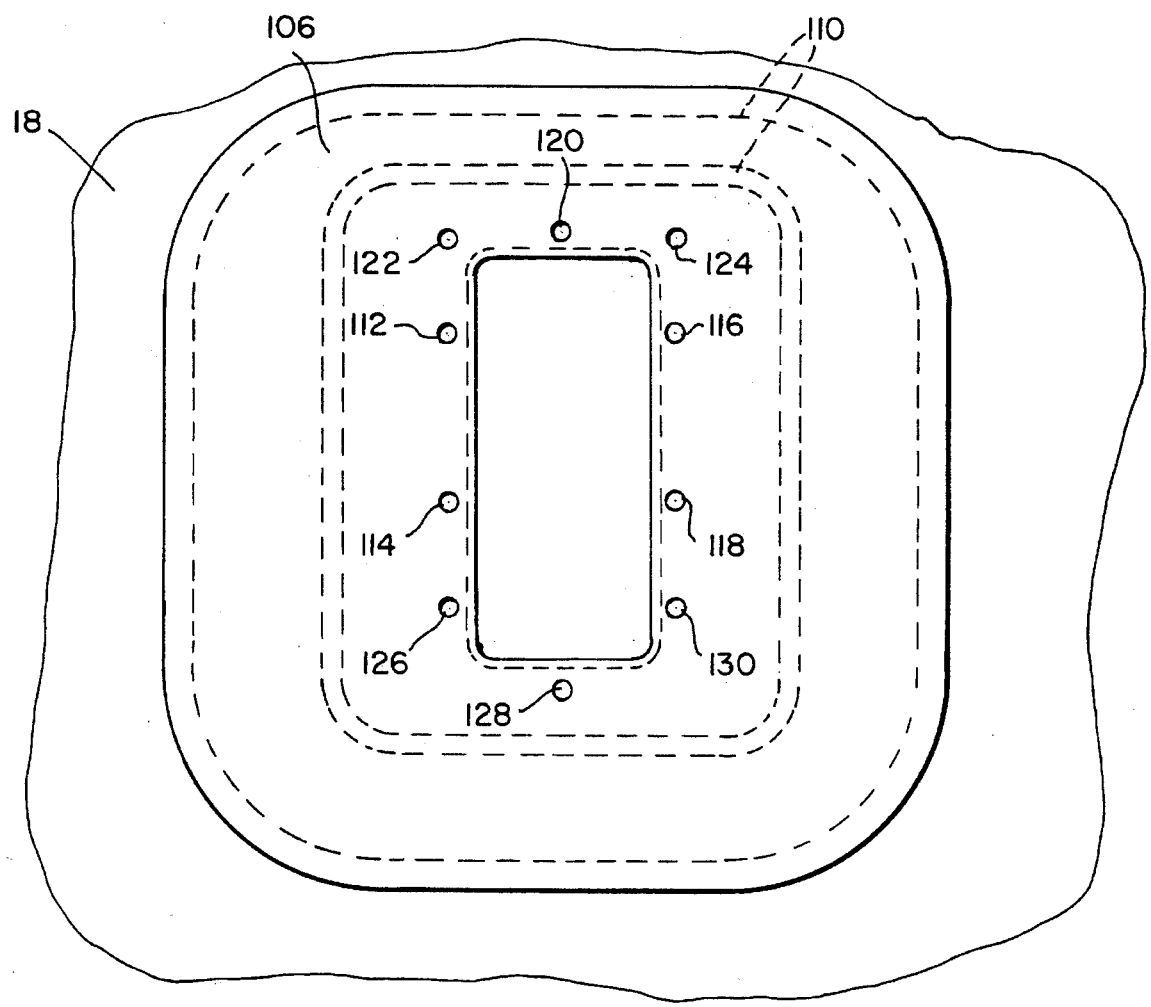
FIG. 6 is a view illustrating mounting details of the cushion.

In FIG. 6 there is illustrated a portion 106 of the folded inflatable cushion 18. Portion 106 contains a substantially rectangular inflating gas inlet opening 108. The gas inlet opening 108 is rectangular so that the portion 106 can match the raised portion of the slotted section 32 of the module housing 14. In a manner known to those skilled in the art and as described in the aforementioned U.S. Pat. No. 5,290,059, reinforcing patches 110 are provided in supporting relation to the gas inlet opening 108.

Surrounding the gas inlet opening 108 of portion 106 are a number of holes that match in position the tabs that are provided in the retaining ring 16. Specifically, the holes 112, 114, 116, 118 and 120 in cushion portion 106 match in position the retaining ring tabs 80, 82, 84, 86 and 88, respectively, in the retaining ring 16. Holes 122, 124, 126, 128 and 130 in cushion portion 106 match in position the remaining ring holes 70, 72, 74, 76 and 78, respectively, in each of which latter holes a stud is pressed.

In the assembly of the air bag module 10, the retaining ring 16 is inserted inside the cushion 18 through the gas inlet opening 108. The studs 96, 98, 100, 102 and 104 are inserted through each of the holes 122, 124, 126, 128 and 130, respectively, of the cushion portion 108. In addition, the tabs 80, 82, 84, 86 and 88 of the slotted section 32 of the retaining ring 16 extend through the respectively associated holes 112, 114, 116, 118 and 120 of the cushion portion 106.

When the retaining ring 16 and the attached cushion 18 are brought into cooperative relation, that is, in assembled relation, with the module housing 14, the studs 96, 98, 100, 102 and 104 protruding from the retaining ring 16 extend through holes 52, 54, 56, 58 and 60 of the module housing 14.

The cushion is held firmly between the retaining ring 16 and the module housing 14 during assembly of the remainder of the air bag module 10. Following such attachment of the retaining ring 16 and cushion 18 to the module housing 14, the cushion is folded and module cover 20 is attached to the module housing 14 with the folded cushion stored therein.

Figure 9:
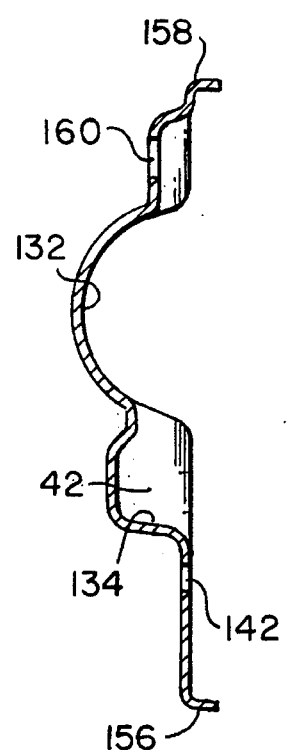
FIG. 9 is a sectional view of the inflator retaining bracket taken along the lines 9—9 of FIG. 7.

The tubular inflator assembly 12 is then positioned in the slotted or grooved section 32 of the module housing 14 and attached by the retaining bracket 22 to the module housing 14 with the diffuser 26 extending through the hole or opening 40 into the cavity 42 which, as best seen in FIGS. 9, 10 and 11, is in communication with the gas inlet opening 108 of the cushion 18.

The retaining bracket 22 of the air bag module 10 extends around the back side of the tubular inflator assembly 12 and holds it in place against the module housing 14.

Figure 7:
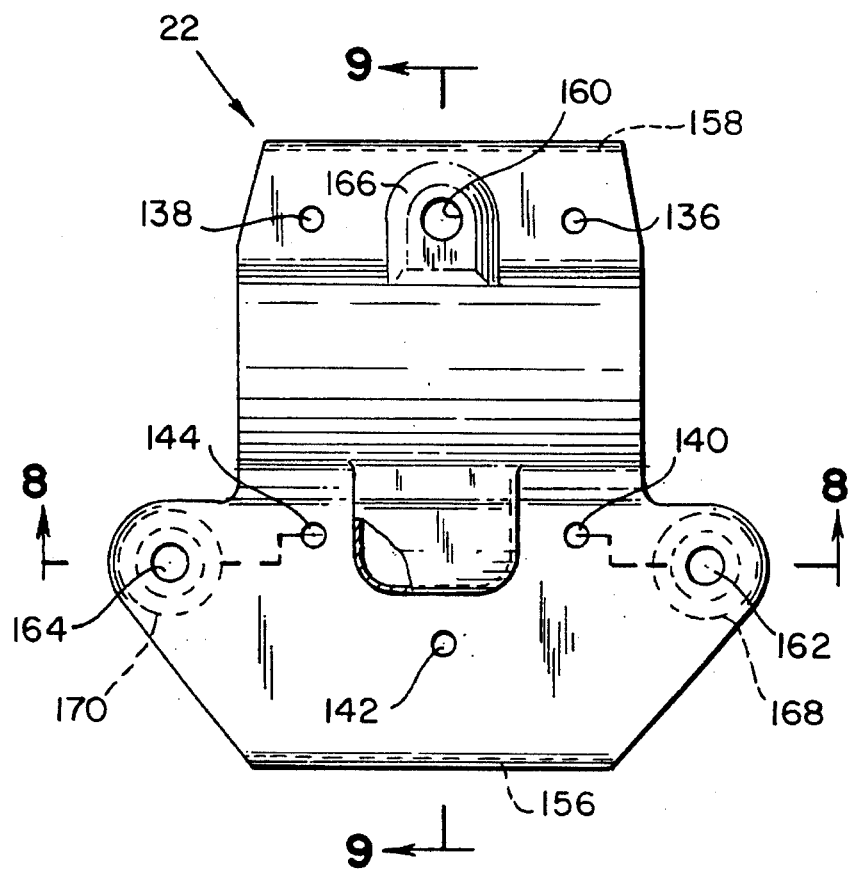
FIG. 7 is a bottom view of the tubular inflator retaining bracket.
Figure 8:
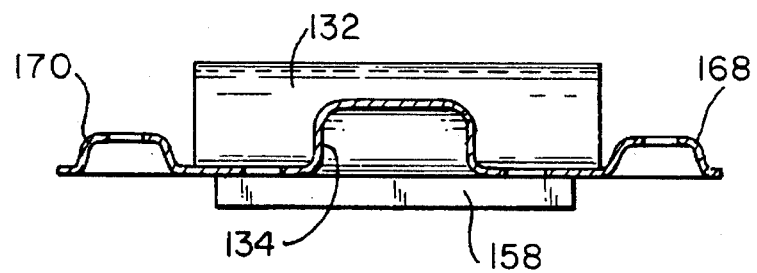
FIG. 8 is a sectional view of the inflator retaining bracket taken along the lines 8—8 of FIG. 7.

As shown in FIGS. 7, 8 and 9, the tubular inflator retaining bracket 22 includes a slotted section 132 and an adjacent pocket 134. The slotted section 132 matches the curvature of the elongated tubular inflator assembly 12. The pocket 134 that the module housing 14 and tubular inflator retaining bracket 22 combine to provide, produces the cavity 42 into which the diffuser 26 of the tubular inflator 12 extends. The positioning of the slotted section 132 of bracket 22 in cooperative relation with the slotted section 32 of the module housing 14 and the diffuser 26 of the tubular inflator 12 seals the housing 14 to assure that gas flowing out of ports 30 of the diffuser 26 goes into the cushion 18. The pocket 134 provides the cavity 42 into which the gas issuing from diffuser ports 30 flows and is allowed to change direction and go up to the gas inlet opening 108 of the cushion 18.

Spaced holes 136, 138, 140, 142 and 144 in the retaining bracket 22 provide a means for the attachment of the retaining bracket 22 to the air bag module 10. Holes 136, 138, 140, 142 and 144 correspond in position to holes 52, 54, 56, 58 and 60 in the module housing 14. Studs 96, 98, 100, 102 and 104 extend through holes 136, 138, 140, 142 and 144 and are provided with respectively associated nuts 146, 148, 150, 152 and 154 for holding together the assembled components 12, 14, 16, 18, 20 and 22 of the module 10.

As best seen in FIG. 9, cover retaining tangs 156 and 158 are provided on the inflator retaining bracket 22. The cover retaining tangs 156 and 158 are incorporated in the inflator retaining bracket 22 so that it is a one-piece system, instead of two or three pieces as provided in many current air bag modules. The cover retaining tangs 156 and 158 cooperate with the module housing wall and lip 46 to lock the cover 20 in place on the air bag module 10.

The radius of the slotted section 132 of the retaining bracket 22 is made such that, when the nuts 146, 148, 150, 152 and 154 on the studs 96, 98, 100, 102 and 104 which hold the module 10 together are torqued down, the inflator 12 is held very firmly in position in the housing 14 during the life of the module 10.

The mounting points of the air bag module 10 are located on the tubular inflator retaining bracket 22 and comprise three holes 160, 162 and 164 which, as best seen in FIGS. 7 and 8, are positioned in circular embossments 166, 168 and 170. These holes facilitate the attachment by bolts or studs (not shown) of the air bag module 10 to the steering wheel 172 of an automotive or other vehicle.

Thus, in accordance with the invention, there has been provided an air bag module for the driver side of an automotive or other vehicle in which a tubular inflator assembly of thrust neutral type is employed. The tubular inflator assembly is mounted off center in the air bag module and is held firmly in position therewithin with the inflating gas discharge exit openings thereof substantially sealed within the inflating gas inlet opening of the inflatable cushion stored within the air bag module. The invention is advantageous in that it facilitates folding much of the stored inflatable cushion on the sides of the tubular inflator and allows the envelope of the module to be smaller than that obtained using the center mounted tubular inflator arrangement because of the reduced dimension from the back of the inflator to the front of the cover along the axis of the steering column.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims and their equivalents.

What is claimed is:

1. A vehicle air bag module comprising, a module housing including a flat bottom, a slotted section with a curved wall running the width thereof, and having an inflator diffuser opening lying in the plane of the bottom of the module housing and in a portion of said module housing slotted section at a position intermediate the ends thereof, a folded inflatable cushion having a gas inlet rectangularly shaped opening with an inner periphery, a retaining ring extending around the inner periphery of said gas inlet opening of said cushion, said retaining ring having slotted sections with curved walls that match and are disposed adjacent said slotted section of said module housing, a tubular inflator comprising a cylindrical housing and a diffuser that projects laterally outwardly from said inflator at a position intermediate the ends thereof, said tubular inflator being disposed in said slotted section of said module housing with said diffuser extending through said inflator diffuser opening, and a retaining bracket having a slotted section that matches and is disposed adjacent to and extends around the back side of said tubular inflator to hold said inflator in place thereagainst.

2. A vehicle air bag module as defined in claim 1, further including fastening means connected to said retaining ring holding said retaining bracket in position against said tubular inflator.

3. A vehicle air bag module as defined in claim 1, wherein said diffuser projects laterally outwardly at an angle of substantially 90° from a generally central position along the length of said tubular inflator.

4. A vehicle air bag module as defined in claim 1, wherein said diffuser opening in said slotted section of said module housing is sized closely to the size of said tubular inflator diffuser so that said tubular inflator does not move in said air bag module.

5. A vehicle air bag module as defined in claim 1, wherein said diffuser of said tubular inflator includes gas exit ports facing in opposing directions whereby when activated said tubular inflator is thrust neutral.

6. A vehicle air bag module as defined in claim 5, wherein the shape of said diffuser of said tubular inflator is generally cylindrical, and the shape of said opening in said slotted section of said module housing is generally circular.

7. A vehicle air bag module as defined in claim 1, wherein said retaining bracket includes a pocket adjacent said slotted section therein, with said pocket providing a cavity into which said diffuser extends and into which gas from said diffuser flows and from which gas flows through said gas inlet opening of said cushion to inflate said cushion.

8. A vehicle air bag module as defined in claim 7, wherein said diffuser opening in said slotted section of said module housing is sized closely to the size of said diffuser of said tubular inflator so that said diffuser of said tubular inflator is substantially sealed within said cavity.

9. A vehicle air bag module as defined in claim 7, wherein said tubular inflator diffuser is generally cylindrical and includes a neck adjacent the exterior surface of said tubular inflator, and wherein a tight fit of said module housing and said tubular inflator retaining bracket around said neck of said diffuser provides a seal to force the gas flowing from said diffuser to flow into said cushion and retains said tubular inflator from moving relatively to said module housing in a first direction generally parallel to the length of said tubular inflator, and in a second direction transversely of the length of said tubular inflator, and wherein movement of said tubular inflator in a third direction generally away from said module housing is prevented by said inflator retaining bracket which goes around the back side of said tubular inflator.

10. A vehicle air bag module as defined by claim 1, wherein said air bag module has a top and a bottom, and wherein said slotted section of said housing is disposed off center with respect to said air bag module, that is, positioned closer to said module top than to said module bottom.

11. An air bag module as defined by claim 11, wherein said module housing, said inner periphery of the gas inlet opening of said cushion, said retaining ring, and said retaining bracket each include a plurality of holes that are in alignment with similar holes in the other components recited, and fastening means for holding said retaining bracket very firmly against the back side of said tubular inflator and for holding said module housing, said inner periphery of said cushion against the front side of said tubular inflator, said fastening means comprising a stud extending through each of said aligned holes in said components in the order recited, and a nut torqued down said retaining bracket on each of said studs.

* * * * *